(12) United States Patent
Sundaresan et al.

(10) Patent No.: US 11,714,617 B1
(45) Date of Patent: Aug. 1, 2023

(54) TREE-BASED MERGE CONFLICT RESOLUTION WITH MULTI-TASK NEURAL TRANSFORMER

(71) Applicant: MICROSOFT TECHNOLOGY LICENSING, LLC., Redmond, WA (US)

(72) Inventors: Neelakantan Sundaresan, Bellevue, WA (US); Alexey Svyatkovskiy, Bellevue, WA (US); Negar Ghorbani, Irvine, CA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 17/584,382

(22) Filed: Jan. 26, 2022

(51) Int. Cl.
*G06F 8/41* (2018.01)
*G06N 3/04* (2023.01)
*G06F 8/30* (2018.01)
*G06N 3/08* (2023.01)

(52) U.S. Cl.
CPC ........... *G06F 8/44* (2013.01); *G06F 8/30* (2013.01); *G06F 8/427* (2013.01); *G06N 3/04* (2013.01); *G06N 3/08* (2013.01)

(58) Field of Classification Search
CPC ..... G06F 8/30; G06F 8/31; G06F 8/33; G06F 8/34; G06F 8/427; G06F 8/44; G06N 3/02; G06N 3/04; G06N 3/08
USPC ......................................................... 717/110
See application file for complete search history.

(56) References Cited

U.S. PATENT DOCUMENTS

| | | | |
|---|---|---|---|
| 11,340,898 B1 * | 5/2022 | Sabharwal | G06N 3/08 |
| 2021/0191715 A1 * | 6/2021 | Samudrala | G06N 3/04 |

OTHER PUBLICATIONS

Zhu, Fengmin, et al., Conflict Resolution for Structured Merge via Version Space Algebra, Proceedings of the ACM on Programming Languages, vol. 2, Issue OOPSLA, Article No. 166, Nov. 2018, 25 pages, [retrieved on Feb. 27, 2023], Retrieved from the Internet: <URL:http://dl.acm.org/>.*
Alon, et al., "Code2seq: Generating Sequences From Structured Representations of Code", in Proceedings of the International Conference on Learning Representations, May 6, 2019, pp. 1-22.
Alon, et al., "Code2vec: Learning Distributed Representations of Code", Proceedings of the ACM on Programming Languages vol. 3, Issue POPL, Jan. 2, 2019, 29 Pages.
Apel, et al., "Semistructured Merge: Rethinking Merge in Revision Control Systems", in Proceedings of the 19th ACM SIG-SOFT Symposium and the 13th European Conference on Foundations of Software Engineering, Sep. 5, 2011, pp. 190-200.

(Continued)

*Primary Examiner* — Geoffrey R St Leger

(57) ABSTRACT

An automated system for resolving program merges uses a multi-task neural transformer with attention. Each component of a merge conflict tuple (A, B, O) is represented as an AST and transformed into aligned AST-node sequences and aligned editing sequences. The multi-task neural transformer model predicts the tree editing steps needed to resolve the merge conflict and applies them to the AST representation of the code base. The tree editing steps include the edit actions that needed to be applied to the AST of the code base and the edit labels that are inserted or updated with the edit actions.

20 Claims, 9 Drawing Sheets

(56) References Cited

OTHER PUBLICATIONS

Apel, et al., "Structured Merge with Auto-Tuning: Balancing Precision and Performance", in Proceedings of the 27th IEEE/ACM International Conference on Automated Software Engineering, Sep. 3, 2012, pp. 120-129.
Falleri, et al., "Fine-grained and Accurate Source Code Differencing", in Proceedings of in ACM/IEEE International Conference on Automated Software Engineering, Sep. 15, 2014, pp. 313-323.
Kim, et al., "Code Prediction by Feeding Trees to Transformers", in Proceedings of in 2021 IEEE/ACM 43rd International Conference on Software Engineering, May 22, 2021, pp. 150-162.
Raychev, et al., "Probabilistic Model for Code with Decision Trees", in Proceedings of ACM SIGPLAN Notices vol. 51, Issue 10, Nov. 2, 2016, pp. 731-747.
Wolf, et al., "Transformers: State-of-the-Art Natural Language Processing", in Proceedings of the 2020 Conference an Empirical Methods in Natural Language Processing: System Demonstrations, Nov. 16, 2020, pp. 38-45.
Zimmermann, Thomas, "Mining Workspace Updates in CVS", in Proceedings of the Fourth International Workshop an Mining Software Repositories, May 20, 2007, 4 Pages.
"International Search Report and Written Opinion Issued in PCT Application No. PCT/US22/048157", dated Jan. 27, 2023, 12 Pages.
Svyatkovskiy, et al., "MergeBERT: Program Merge Conflict Resolution via Neural Transformers", In Repository of arXiv:2109.00084v2, Sep. 8, 2021, 16 Pages.

\* cited by examiner

TREE-BASED MERGE CONFLICT RESOLUTION WITH MULTI-TASK NEURAL TRANSFORMER

BACKGROUND

During a software development project, a team of developers may collaborate on the source code, documentation, test scripts and other files and collections of data which are stored in a repository accessible to the developers of the team. To manage the changes made to a file during development, the files may be stored in a repository managed by a version control system. The version control system maintains the versions of the files of a repository and the history of changes made to the files over time.

In a distributed version control system, the repository is distributed to each collaborator including the complete revision history and a working copy of the code base. A branch is a duplication of a file subject to the version control system for an independent line of development so that changes can be made to the duplicate file independent of the original file. A merge command is used to integrate changes across the two branches in a version control system. A merge can be performed automatically if there is no conflict. A merge conflict arises when two programs make changes to the same source code segment. The merge conflict needs to be resolved before the revisions are merged back to the repository and in a manner that does not introduce subtle bugs or unwanted program behavior. The merge command does not provide suggestions on how to perform a merge rather indicates the existence of a merge conflict when a conflict is detected. Often the user has to resolve the conflict by combining the changes or selecting only one of the changes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An automated system for resolving program merges uses a multi-task neural transformer with attention. Each component of a merge conflict tuple (A, B, O) is represented as an abstract syntax tree (AST) and transformed into aligned AST-node sequences and aligned edit sequences. The aligned AST-node sequences show the relationship between similar AST-nodes of each changed code (A, B) relative to the code base (O). The aligned edit sequences show the differences between the aligned AST nodes of a changed code and the code base.

A multi-task neural transformer model predicts the tree editing steps needed to resolve the merge conflict given the aligned AST-node sequences and the aligned edit sequences. The tree editing steps include the edit actions that need to be applied to the AST of the code base and the edit labels that are inserted or updated with the edit actions.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1A:
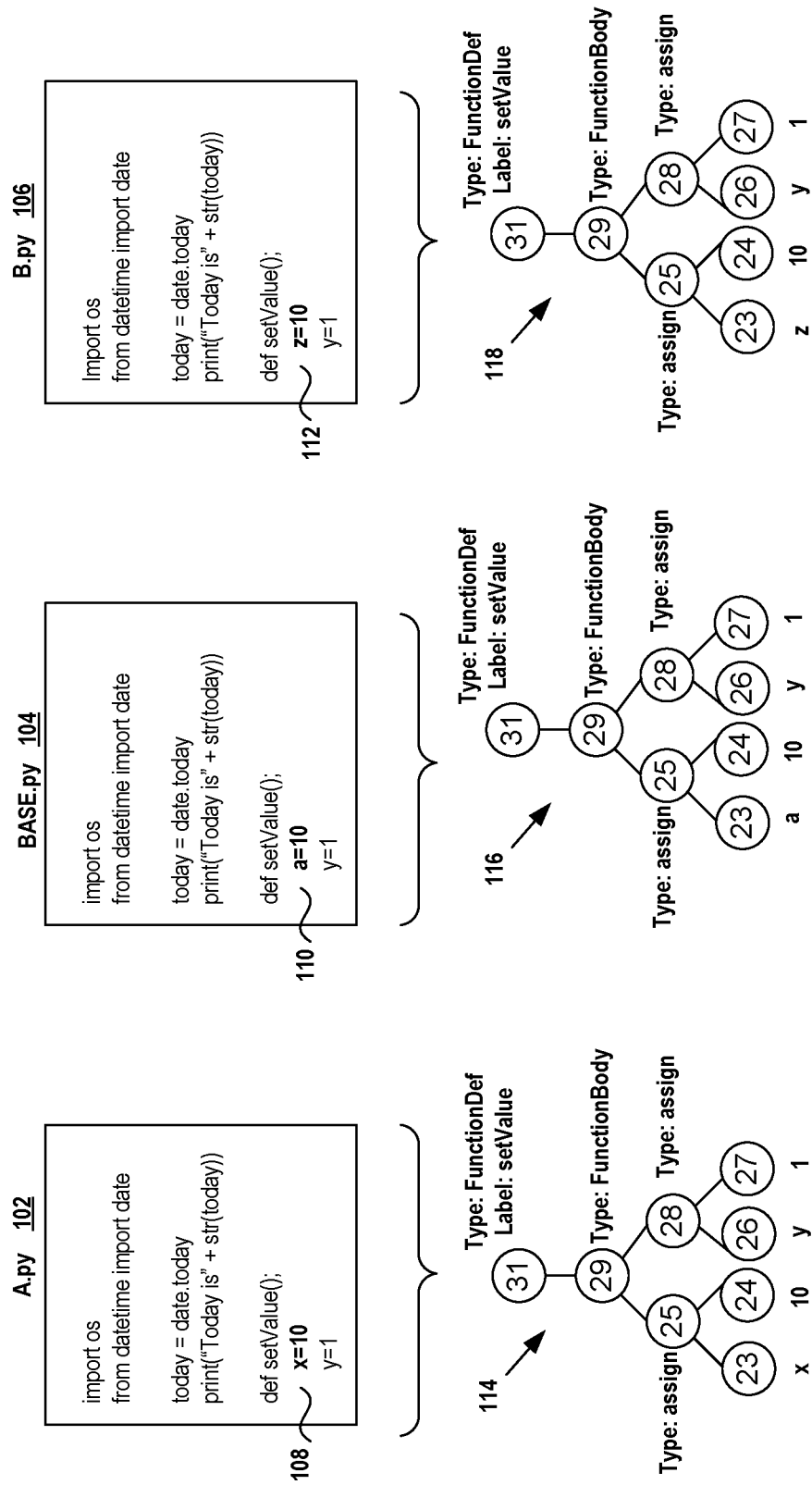
FIGS. 1A-1B depict an exemplary merge conflict that is resolved using a multi-task neural transformer model.

The subject matter pertains to an automated system for resolving a merge conflict program using a multi-task deep learning model. A three-way program merge takes as input two programs, A and B, obtained by modifying a common base program O and provides a merged program that preserves the intent of the changes made in A and B over O automatically. The merge conflict is viewed as a multi-task machine translation problem where aligned AST node sequences are used to represent the merge conflict. The deep learning model predicts the tree-editing steps needed to resolve the merge conflict and the nodes of the AST of the common base program to which the tree-editing steps are applied to resolve the merge conflict.

Source code repositories may offer three-way merge tools that automatically merge changes made to different branches of a repository. These tools utilize semantic-based techniques or text-based techniques both of which are prone to introducing unwanted behaviors and errors. A text-based merge technique treats programs as list-structured textual data. One example of a text-based merge program is the Unix utility diff3. This technique aligns the two-way diffs of program A over the common code base program O into a sequence of diff slots and incorporates the textual change from one of A or B at each slot unless both programs change a common slot. If both programs change a common slot, a textual merge conflict is produced that requires manual resolution of the conflicting textual changes.

Semantic-based merge techniques are based on an analysis of the behavior of the program execution of the proposed changes. A semantic-based merge technique relies on program analysis techniques that analyze output values altered by the changes. The two programs A and B make conflicting changes if and only if they both alter the behavior of an output variable in a common execution path. However, this technique has limited scalability and application. For example, dynamic programming features, such as reflection in some object-oriented programming languages (C#, Java) and eval in Python and JavaScript cannot be determined statically and are performed at runtime.

The deep learning merge techniques overcome these limitations by using a data-driven approach that learns to predict a merge resolution from real-world merges and merge-conflict data. This data-driven approach considers the semantics of the proposed merger and the syntax of the programming language.

Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping. Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning.

Attention now turns to a further description of the systems, devices, methods for automated merge conflict resolution with a multi-task neural transformer model.

Tree-Based Merge Resolution Using Neural Transformers

Figure 1B:
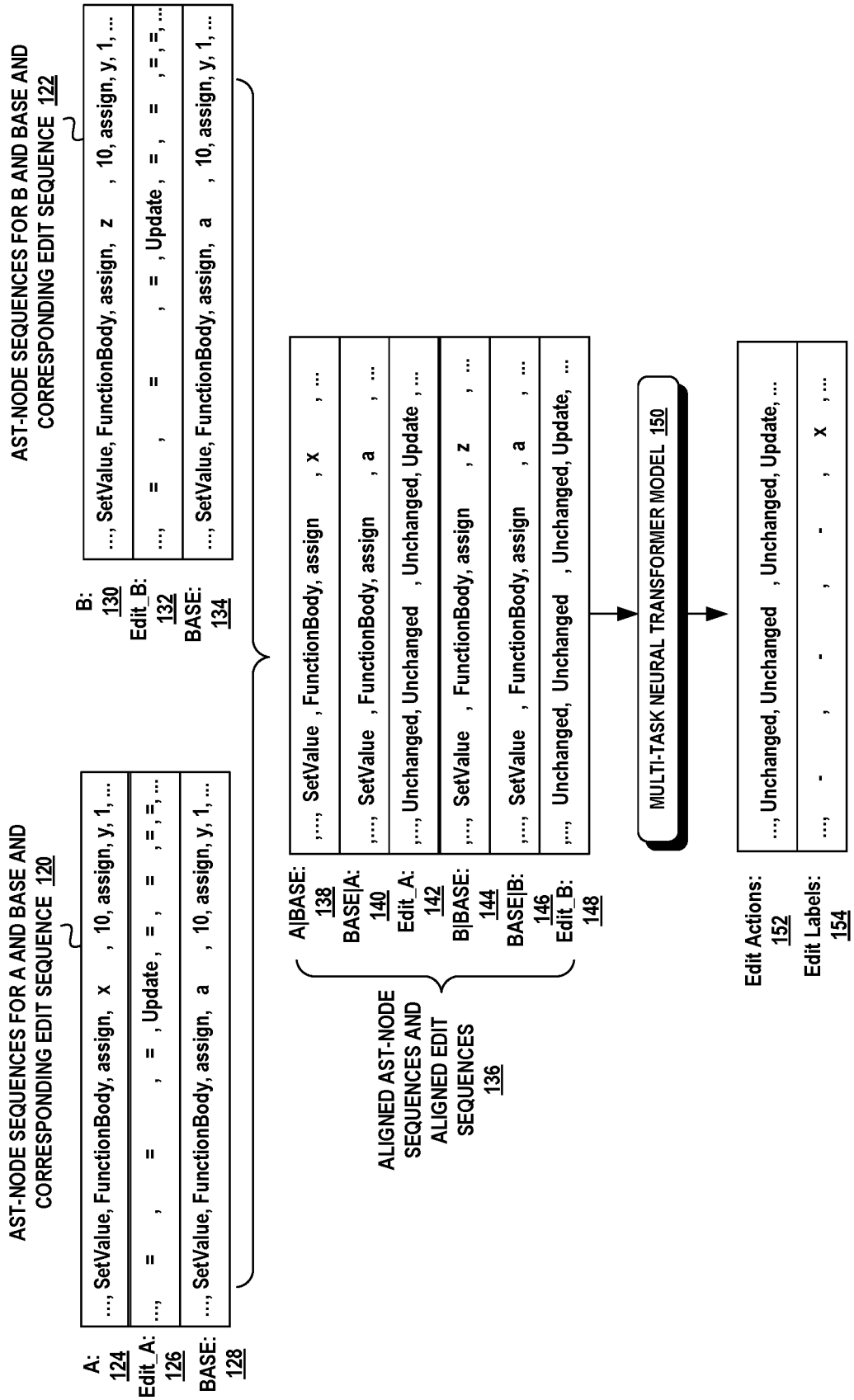

FIGS. 1A-1B illustrate a tree-based merge resolution for an exemplary merge conflict using a multi-task neural transformer. A three-way merge conflict is shown with respect to Python programs A.py ("A") 102, Base.py ("BASE") 104, and B.py ("B") 106. Base.py 104 is the code base and programs A.py 102 and B.py 106 contain conflicting changes proposed to Base.py 104. In particular, in code base, Base.py 104, in the function body of setValue( ) the variable a is initialized to the value 10 at line 110. In program A.py, the variable x is initialized at line 108 to the value 10 and in the program B.py, the variable z is initialized at line 112 to the value 10.

Each source code snippet of the merge conflict is represented as an abstract syntax tree (AST). An AST is a tree representation of a program that represents the syntactic structure of a program in a hierarchical or tree structure. An AST for a source code snippet C is a tuple <N, T, X, s, δ, φ>where N is a set of non-terminal nodes, T is a set of terminal nodes, X is a set of values, s E N is the root node, δ:N->(N U T)* is a function that maps a nonterminal node to a list of its children, and φ:T->X is a function that maps a terminal node to an associated value.

An abstract syntax tree is an abstract representation of the structure of the source code using abstract programming constructs, such as expressions, control flow statements, etc. The node of an AST is abstract since it does not represent all the details of a source code token, only its semantics. The AST represents the relationship between the programming construct. An AST differs from a parse tree which represents source code in terms of tokens written according to the grammar of a specific programming language.

As shown in FIG. 1A, code snippet A.py 102 is represented by AST 114, program Base.py 104 is represented by AST 116, and code snippet B.py 106 is represented by AST 118. Each non-terminal node stores a type and/or label. A terminal node stores a label. A label is a value or a token. The type is a high-level syntactic element, such as FunctionBody, assign, FunctionDef, etc.

Turning to FIG. 1B, from each AST, aligned AST-node sequences and aligned edit sequences are generated which are input into the multi-task neural transformer model. In order to generate the aligned AST-node sequence, an AST sequence generator traverses each AST in a preorder traversal order to generate a linearized sequence of AST nodes for each source code snippet A, B, and BASE of the merge conflict.

As shown in FIG. 1B, each AST of the source code snippet of the merge conflict is transformed into an AST-node sequence. For example, when AST 114 is traversed in a preorder traversal order, the linearized sequence of AST nodes includes "SetValue, FunctionBody, assign, x, 10, assign, y, 1" 124. Likewise, when AST 116, which represents BASE.py, is traversed in a preorder traversal order, the linearized sequence of AST nodes includes "SetValue, FunctionBody, assign, a, 10, assign, y, 1" 128, 134. AST 118, which represents B.py, is traversed into the AST-node sequence "SetValue, FunctionBody, assign, z, 10, assign, y, 1" 130. The linearized sequence of AST nodes differs from a path through the AST, such as a path from the root node to a leaf node or a path from one leaf node to another leaf node. The preorder traversal generates a prefix expression where the operators are positioned before their operands in the linearized sequence.

The AST sequence generator performs a pair-wise alignment between each AST-node sequence 124, 130 and the AST-node sequence of the code base 128, 134. The pair-wise alignment aligns similar AST nodes in the AST-node code base sequence 128, 134 with the same AST nodes in the changed AST-node sequence 124, 130. The pair-wise alignment between a pair of AST-node sequences is used to generate edit sequences 126, 132. An edit sequence 126, 132 shows the operations (e.g., Unchanged (=), Update, Delete, Insert or Move) needed to transform the code base O into the AST-node sequence by using edit actions to denote the operations. The edit actions in an edit sequence indicate the similarities and differences between the aligned tokens. The edit actions include the following: Unchanged (=) indicates that the aligned AST-node is left unchanged; Update indicates that the aligned AST-node should be updated; Insert indicates that a new AST node should be added; Delete indicates that the aligned AST-node should be deleted; and Move indicates that the aligned AST node is moved to a different location in the tree.

The AST nodes in AST-node sequence A 124 is aligned with the AST-nodes in AST-node sequence BASE 128 to generate edit sequence Edit_A 126. The edit sequence includes an aligned list of edit actions that should be performed to the AST of the code base to resolve the conflict. Likewise, the AST nodes in AST-node sequence B 130 is aligned with the AST-nodes in AST-node sequence BASE 134 to generate edit sequence Edit_B 132. Edit sequence Edit_B 132 includes an aligned list of edit actions that should be performed to the AST of the code base to resolve the conflict.

The aligned AST-node sequences are generated relative to similar AST nodes in the aligned AST-node sequence of the code base. For example, A|BASE 138 represents the aligned AST-node sequence of AST-node sequence A relative to the aligned AST nodes in AST-node sequence BASE. BASE|A 140 represents the aligned AST-node sequence BASE relative to the aligned AST nodes in AST-node sequence A. B|BASE 144 represents the aligned AST-node sequence B relative to the aligned AST nodes in AST node sequence BASE. BASE|B 146 represents the aligned AST-node sequence BASE relative to the aligned AST nodes in AST node sequence B.

The aligned AST-node sequences represent the syntax of a modified program and the differences in the syntax with the code base. The edit sequences, Edit_A 142 and Edit_B 148, represent the operations needed to alter the code base to implement the changes in the modified program.

Each of the aligned AST-node sequences (A|BASE, BASE|A, B|BASE, BASE|B) and the aligned edit sequences (Edit_A, Edit_B) are input into the multi-task neural transformer model 150 which outputs a sequence of edit actions and a sequence of edit labels. The sequence of edit actions indicates the actions that should be performed to the AST nodes of the code base to resolve the conflict. The edit labels indicate the values or source code tokens that are inserted or updated in accordance with the edit actions.

Attention now turns to the system for training the multi-task neural transformer with attention to predict the tree-editing steps needed to resolve a merge conflict.

System

Figure 2:
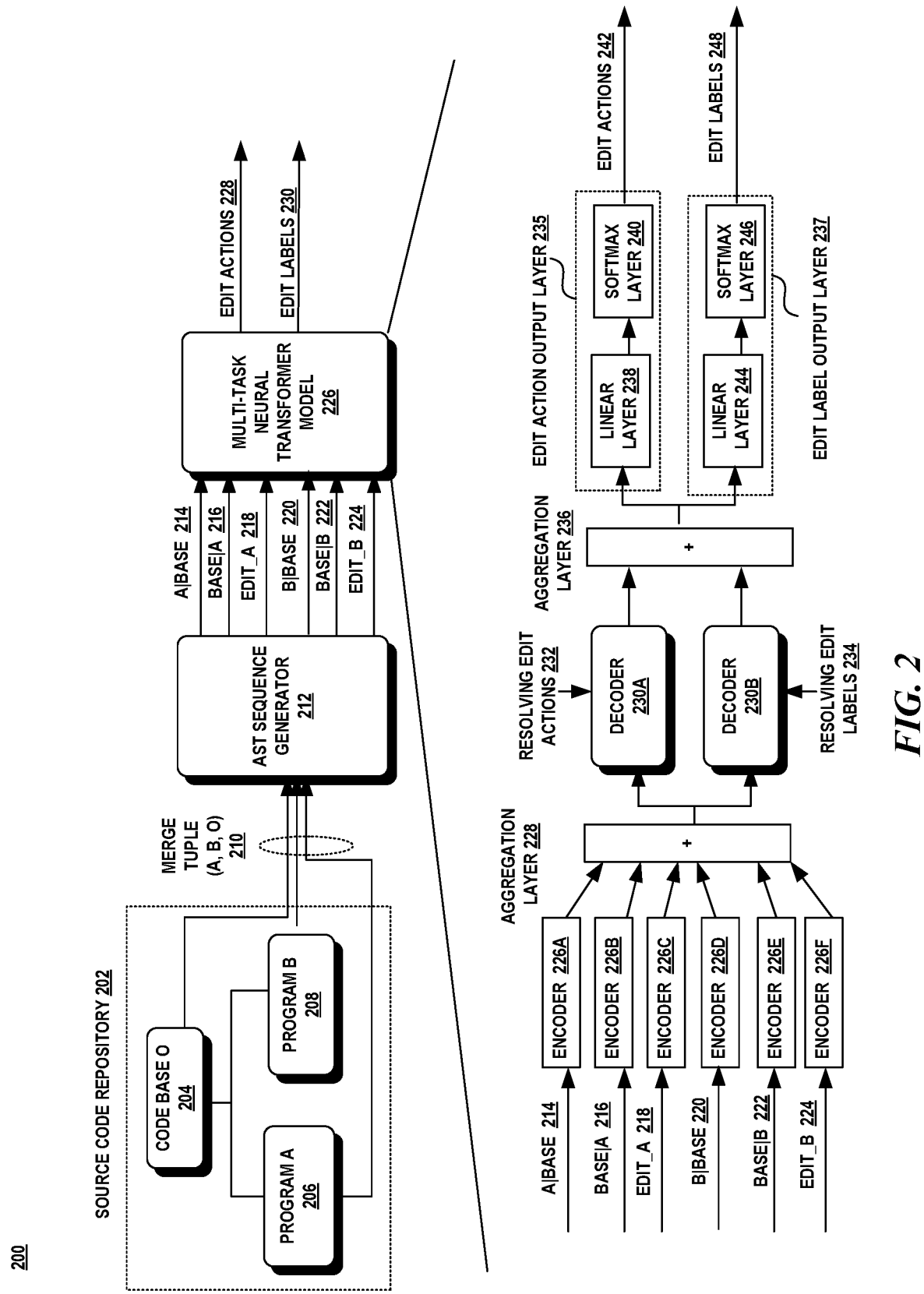
FIG. 2 is a schematic diagram illustrating a system to train a multi-task neural transformer model to resolve a merge conflict.

FIG. 2 illustrates the components of an exemplary system 200 for training a multi-task neural transformer with attention model to predict AST-node edit actions and edit labels to resolve a merge conflict. The model is trained from merge tuples and the actions used to resolve the merge conflict (resolving edit actions 232, resolving edit labels 234). A merge tuple (A, B, O) 210 is obtained from a source code repository 202 and includes program A 206 and program B 208, both having changes to a code base O 204. The AST sequence generator 212 parses each source code snippet of the merge tuple 210 into a respective abstract syntax tree, which is traversed in preorder traversal order to generate AST-node sequences which are aligned to generate the aligned AST-node sequences (214, 216, 220, 222) and corresponding edit sequences (218, 224). The aligned AST-node sequences (214, 216, 220, 222) and corresponding edit sequences (218, 224) are applied to the multi-task neural transformer model 226 to learn to predict the edit actions 228 and edit labels 230 that resolve the merge conflict.

A source code repository 202 is a file archive that hosts projects having source code files and other data (e.g., scripts, test cases, etc.) shared by multiple developers. The source code repository 202 may be private and internal to an organization, group, enterprise or user or may be publicly-accessible through the Internet. The source code repository 202 may contain source code files from different domains, such as without limitation, scientific computing, web development, dataflow programming, machine learning, and the like.

The source code repository 202 may include a version control system that manages changes made to the source code files, such as Git and Mercurial. In one aspect, the source code repository 202 is distributed where each developer has their own local repository of the source code with the history and versions of the source code.

Although the disclosure uses references from Git to describe the techniques described herein, it should not be construed as limiting the disclosed techniques to this particular source code repository and/or version control system.

A developer may use a copy of a source code file to develop features isolated from other copies of the source code file by placing the copy in a branch. Branches are used to distinguish a version of a source code file from its parent. A commit command records the changes made to a local repository. A merge command merges changes made in a source code file of a branch back to the parent source code file in the parent of master branch.

In a three-way merge, there are two branches to a parent branch. One branch contains source code snippet A 206 having changes to code base O 204, a second branch contains source code snippet B 208 having changes to code O 204, and the parent branch includes the code base O 204. A merge tuple (A, B, O) is extracted from the source code repository.

The multi-task neural transformer model 226 is configured in an encoder-decoder configuration. In one aspect, the multi-task neural transformer model 226 includes six encoder units with two decoder units, where each decoder unit has a separate output layer for each task, edit actions and edit labels.

The use of a machine learning model presents several challenges to effectively learn a merge algorithm. There needs to be a representation of the merge inputs that identifies the edits from both programs relative to the common base. In addition, this representation needs to be a single sequence since a sequence-to-sequence translation task requires a single input sequence and a single output sequence. In the case of a three-way merge, there are four input sequences that represent the changes between programs A and B relative to the code base and two edit sequences. For this reason, the neural transformer model utilizes six encoder blocks to capture the relationships between the different programs and the proposed edits.

Each of the six distinct encoder units 226A, 226B, 226C, 226D, 226E, 226F is trained on a distinct task. An encoder unit may consist of multiple encoder blocks. Encoder unit 226A receives an input embedding 214 that represents A|BASE, encoder unit 226B receives an input embedding 216 that represents BASE|A, encoder unit 226C receives an input embedding 218 that represents Edit_A, encoder unit 226D receives an input embedding 220 that represents B|BASE, encoder unit 226E receives an input embedding 222 that represents BASE|B, and encoder unit 226F receives in input embedding 224 that represents Edit_B.

The aggregation layer 228 combines the six encoder unit output states by means of a weighted sum transformation with learnable weights A, where $A=\Sigma_{i=0}^{N-1} w_i z_i$, where N is the number of neural encoder transformers, $w_i$ is a learnable weight, and $z_i$ is an encoder output. The aggregation of the encoder output states is passed to each decoder unit, 230A, 230B.

In one aspect, there are two decoder units, 230A, 230B. One decoder unit 230A is used for the task of predicting edit actions and receives the resolving edit actions associated with the merge tuple training sample. The second decoder unit 230B is used for the task of predicting edit labels and receives the resolving edit labels corresponding to the merge tuple training sample.

Each decoder unit 230A, 230B may consist of a number of decoder blocks. The output of each decoder unit is aggregated in aggregation layer 236. Aggregation layer 236 outputs a weighted sum transformation with learnable weights A, where $A=\Sigma_{i=0}^{N-1} w_i z_i$, where N is the number of decoder units, $w_i$ is a learnable weight, and $z_i$ is a decoder output.

The aggregated decoder output is input to each output layer 235, 237. Edit action output layer 235 includes a linear layer 238 and a softmax layer 240. The linear layer 238 is a fully-connected neural network that projects the raw scores output by the decoder aggregation layer 236 into a logits vector. The softmax layer 240 applies the softmax function to the logits vector to compute a vector that represents the probability distribution of a list of edit actions. Edit label output layer 237 includes a linear layer 244 and a softmax layer 246. The linear layer 244 is a fully-connected neural network that projects the raw scores output by the decoder aggregation layer 236 into a logits vector. The softmax layer 246 applies the softmax function to the logits vector to compute a vector that represents the probability distribution of a list of edit labels.

Each of the decoder output layers has a different neural network in its respective linear layer trained according to a different optimization objective. More specifically, their loss functions are different as they are optimizing their learning mechanism toward two different outputs. The edit action output layer 235 is learning to predict edit actions, and hence, its loss function compares its outputs with edit action data during its training. The edit label output layer 237 is learning to predict edit labels. Therefore, it has a loss function that optimizes its learning toward the edit label data in the training phase.

Attention now turns to a more detailed description of the multi-task neural transformer model architecture.

Multi-Task Neural Transformer Model Architecture

Figures 3A, 3B:
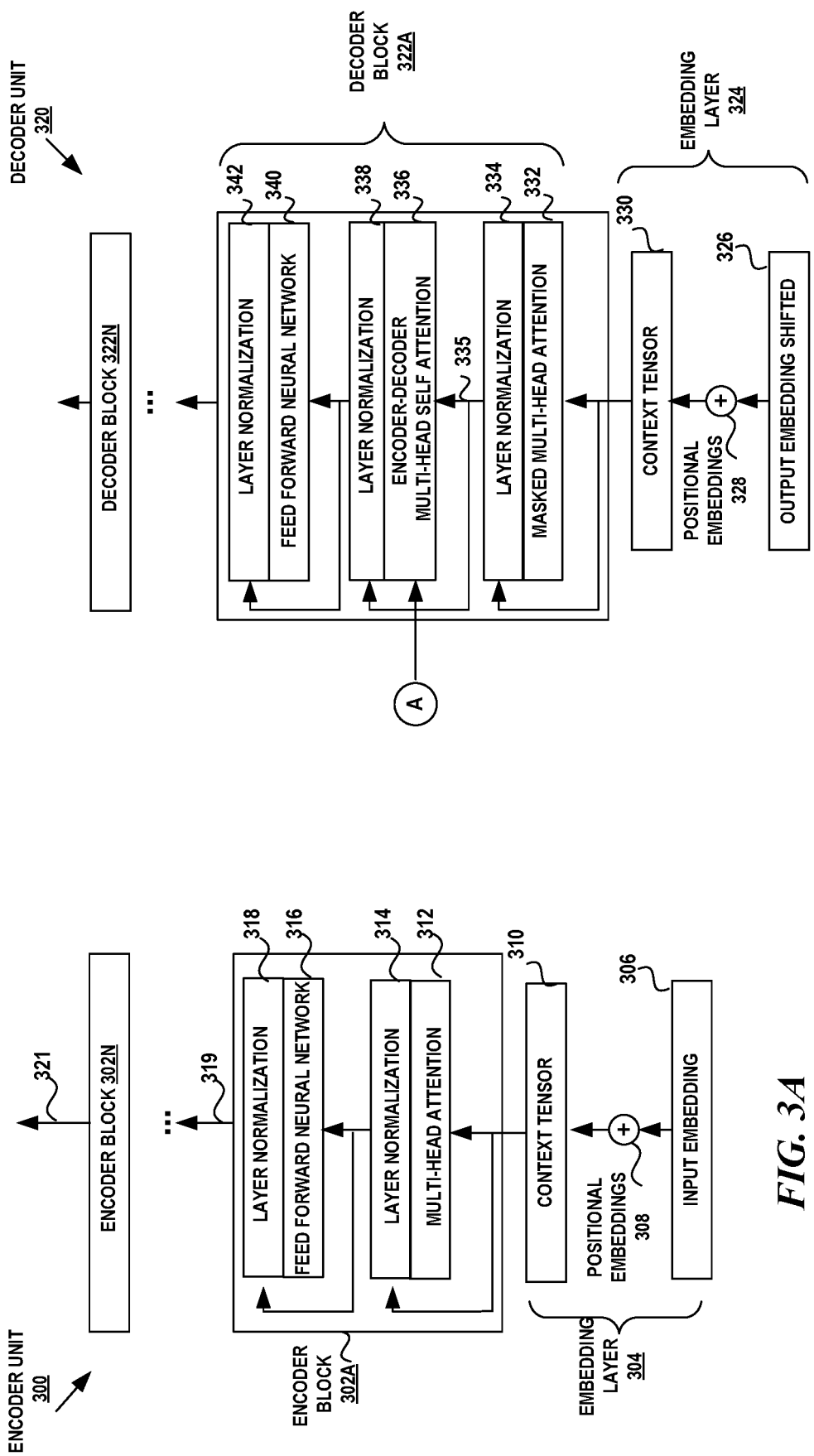
FIG. 3A is a schematic diagram illustrating an exemplary encoder unit of the multi-task neural transformer model and FIG. 3B is a schematic diagram illustrating an exemplary decoder unit of the multi-task neural transformer model.

Turning to FIG. 3A, there is shown an exemplary diagram of the encoder unit of a neural transformer model 300. Each encoder unit 300 includes an input or embedding layer 304 and one or more encoder blocks 302A-302N ("302"). The embedding layer 304 includes a context tensor 310 that includes the input embeddings of an input sequence (e.g., A|BASE, BASE|A, B|BASE, BASE|B, Edit_A, Edit_B) and its associated positional embeddings 308.

An encoder block 302 consists of two layers. The first layer includes a multi-head self-attention component 312 followed by layer normalization component 314. The second layer includes a feed-forward neural network 316 followed by a layer normalization component 318. The context tensor 310 is input into the multi-head self-attention layer 312 of the first encoder block 302A with a residual connection to layer normalization 314. The output of the layer normalization 314 is input to the feed forward neural network 316 with another residual connection to layer normalization 318. The output of each encoder block is a set of hidden representations. The set of hidden representations 319 is then sent through additional encoder blocks, if multiple encoder blocks exist.

The multi-head self-attention component 312 takes a context tensor 310 and weighs the relevance of each AST node represented in the context tensor to each other by generating attention weights for each AST node in the input embedding. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one AST node in an input sequence, K is the vector representations of all AST nodes in the input sequence, and V is the vector representations of all the AST nodes in the input sequence.

The queries, keys and values are linearly projected h times in parallel with $d_v$, output values which are concatenated to a final value:

MultiHead(Q, K, V)=Concat(head$_1$, . . . , head$_h$) W$^\circ$ , where head$_i$=Attention(QW$_i^Q$, KW$_i^K$, VW$_i^V$) with parameter matrices W$_i^Q \in \mathbb{R}^{d_{model} \times d_k}$, W$_i^K \in \mathbb{R}^{d_{model} \times d_k}$, W$_i^V \in \mathbb{R}^{d_{model} \times d_k}$, and W$^O \in \mathbb{R}^{hd_v \times d_{model}}$.

In order to reduce the training time of the encoder block, layer normalization is used between the layers. The layer normalization component normalizes the inputs across the features. The mean and standard deviation is computed across the feature dimensions. There is a first layer normalization 314 that precedes the feed forward neural network 316 and a second layer normalization 318 that follows the feed forward neural network 316. The feed-forward neural network 316 processes each output encoding separately. The output of the top encoder block 302N is a set of attention vectors K and V 321 that represent the last hidden layer.

The decoder block 322A-N predicts each subtoken $t_i$ in the target language one-by-one at each time step conditioned on all previously-generated target subtokens $t_1, \ldots t_{i-1}$. A decoder block 322A-N consists of three layers. The first layer includes a masked multi-head attention component 332 followed by a layer normalization component 334. The output of the layer normalization component 334 is input into the encoder-decoder multi-head attention component 336 with a residual connection to layer normalization component 338. The second layer includes an encoder-decoder multi-head attention component 336 followed by a layer normalization component 338. The output of layer normalization component 338 is input into the feed forward neural network 340 with a residual connection to layer normalization component 342. The third layer includes a feed forward neural network 340 and then a layer normalization component 340.

The masked multi-head attention component 332 receives the output embeddings of the previous timestep. The masked multi-head attention component 332 masks the output embeddings from future time steps. The encoder-decoder multi-head attention layer 336 receives queries from the previous decoder layer 335 and the aggregated memory keys and values from the encoder aggregation layer 344, 228. In this manner, the decoder block 322 can attend to every position of the input sequence. The feed-forward neural network 340 processes each output encoding separately. A layer normalization component 334, 338, 342 is used between the layers in order to normalizes the inputs across the features.

Method for Training the Multi-Task Neural Transformer Model

Figure 4:
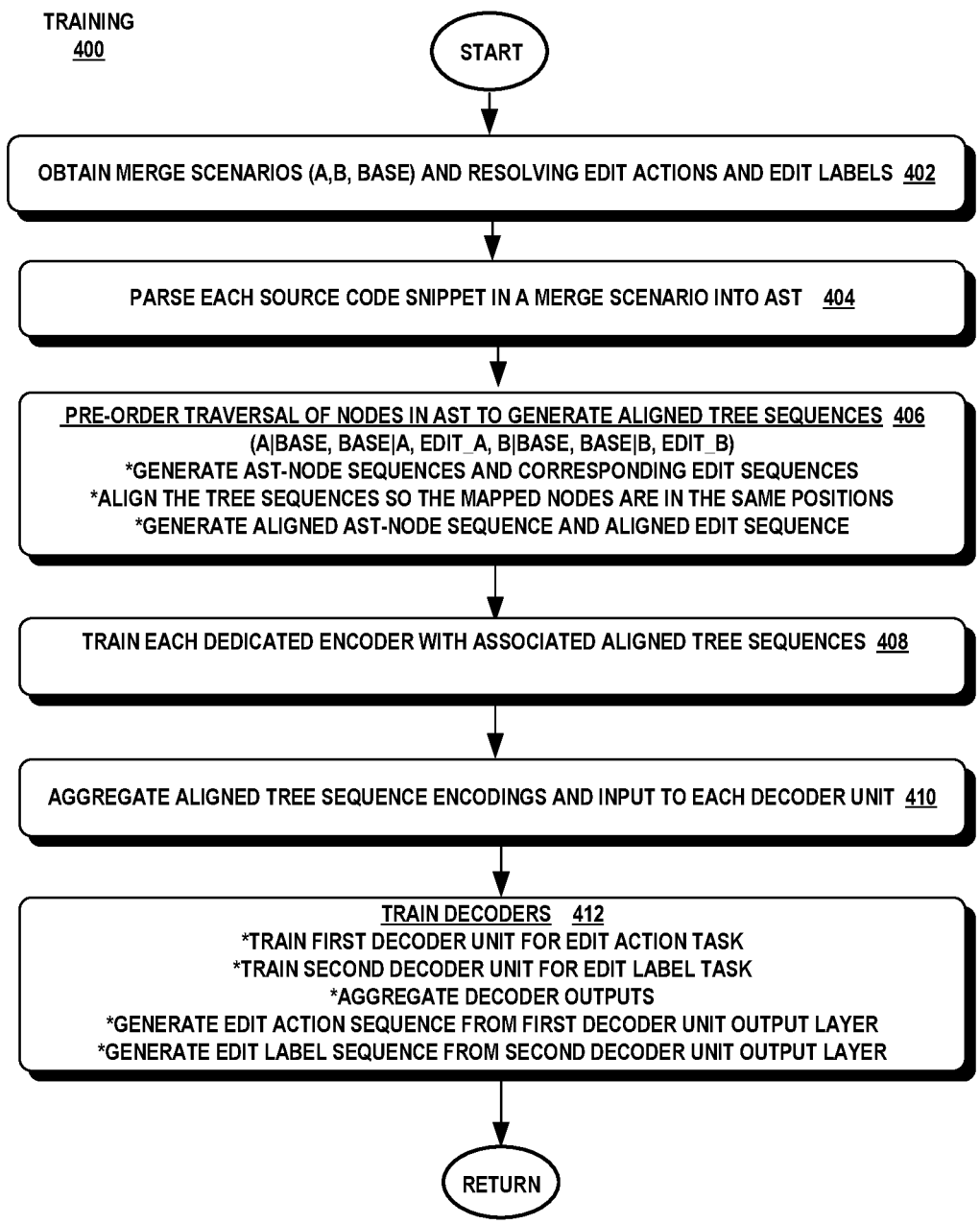
FIG. 4 is a flow diagram illustrating an exemplary method for training the multi-task neural transformer model.

FIG. 4 illustrates an exemplary method for training the multi-task neural transformer model to learn to predict the tree editing steps to resolve a merge conflict. The training data includes merge tuples (A, B, BASE) from existing merge scenarios, resolving edit actions, and resolving edit labels (block 402). The AST sequence generator 212 parses each source code snippet of the merge tuple into a respective AST (block 404).

The nodes of the AST are traversed in a preorder traversal order to generate the AST-node sequences and corresponding edit sequences (A, Edit_A, BASE, B, Edit_B). A tree traversal visits each node of the tree exactly once. In a preorder traversal order, a tree is traversed starting at the root node, then recursively traversing the left subtree, and then recursively traversing the right subtree. Each parent node is traversed before the children's nodes. The preorder traversal generates a prefix expression where operators precede their operations (Collectively, block 406).

Next, the aligned AST-node sequence (A|BASE, BASE|A, B|BASE, BASE|B) and the aligned edit sequences (Edit_A, Edit_B) are generated using the AST-node sequence and corresponding edit sequences (block 406).

Each encoder unit receives a respective aligned AST-node sequence or aligned edit sequence. The first encoder block of each encoder unit takes the context tensor as input and passes it through the multiple layers of multi-head attention, layer normalization, feed-forward neural network, and layer normalization to finally produce a set of hidden representations If there are additional encoder blocks in an encoder unit, the output of each encoder block is passed onto the next encoder block with the output of the last encoder block producing the set of hidden representations. (Collectively, block 408).

The feed forward neural networks in each encoder block are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. (Collectively, block 408).

In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 408).

The final set of hidden representations output from each encoder unit is aggregated and transmitted to each decoder unit (block 410). Decoder unit 230A receives the aggregated encoder output and the resolving edit action for the merge tuple training sample and generates a predicted edit action at each time step (block 412). Decoder unit 230B receives the aggregated decoder output and the resolving edit label for the merge tuple training sample and generates a predict edit label at each time step (block 412).

Each output layer learns a particular task. The edit action output layer 235 learns to predict a sequence of edit actions and the edit label output layer learns to predict a sequence of edit labels to apply to the edit actions. The linear layer of each decoder unit projects the vector produced by the stack of decoders at each time step into a logits vector. The softmax layer then turns the scores of the logits vector into probabilities for each AST node, in the case of the edit action output layer, and into probabilities for each token/value in the AST vocabulary. (Collectively, block 412).

Attention now turns to a more detailed description of the inference process.

Inference Process

Figure 5:
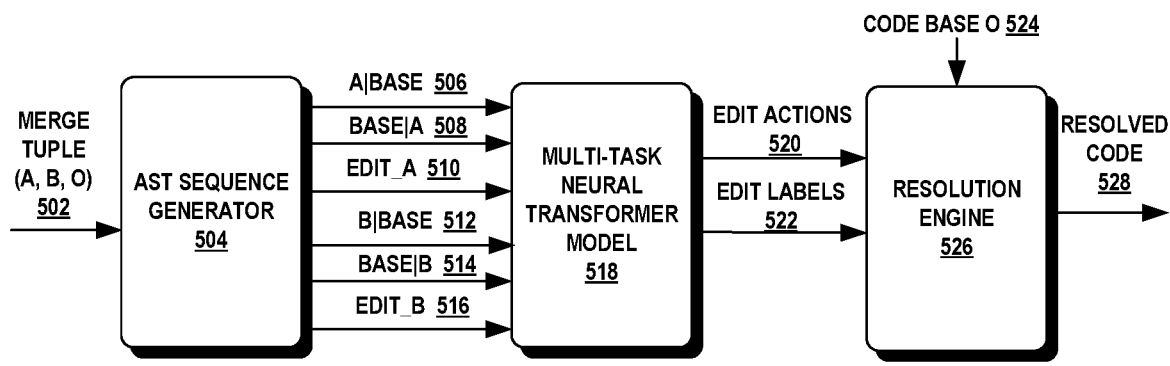
FIG. 5 is a schematic diagram illustrating an exemplary merge conflict resolution system.

FIG. 5 illustrates an exemplary system 500 for the automatic prediction of a resolution to a merge conflict. A merge tuple (A, B, O) 502 is identified and input into the AST sequence generator 504. The AST sequence generator 504 parses each source code snippet of the merge tuple into an AST. The AST sequence generator 504 then traverses each AST in a preorder traversal order to generate a linearized sequence of AST nodes for each source code snippet A, B, and BASE of the merge conflict. The AST sequence generator 504 then generates aligned AST-node sequences (e.g., A|BASE 506, BASE|A 508, B|BASE 512, BASE|B 514) and aligned edit sequences (Edit_A 510, Edit_B 516) from the linearized sequence of AST nodes. The aligned AST-node sequences and the aligned edit sequences are input into the multi-task neural transformer model 518 which outputs predicted edit actions 520 and predicted edit labels 522. A resolution engine 526 receives the edit actions, edit labels, and the code base O and generates a source code snippet showing the edit actions and edit labels applied to code base O.

A resolution engine takes the source code of program BASE, the inferred edit actions and edit labels and then generates the resolved code. More specifically, for each aligned edit action and label, the resolution engine locates the corresponding node in the source code of program BASE using the alignment information. It then edits the located token in the source code of BASE depending on the edit action. The resolution engine updates the located token with the edit label, deletes the located token, updates the located token with the label of a moved token, or adds the edit label to the determined location in cases of update, delete, move, or insert edit actions, respectively.

Figure 6:
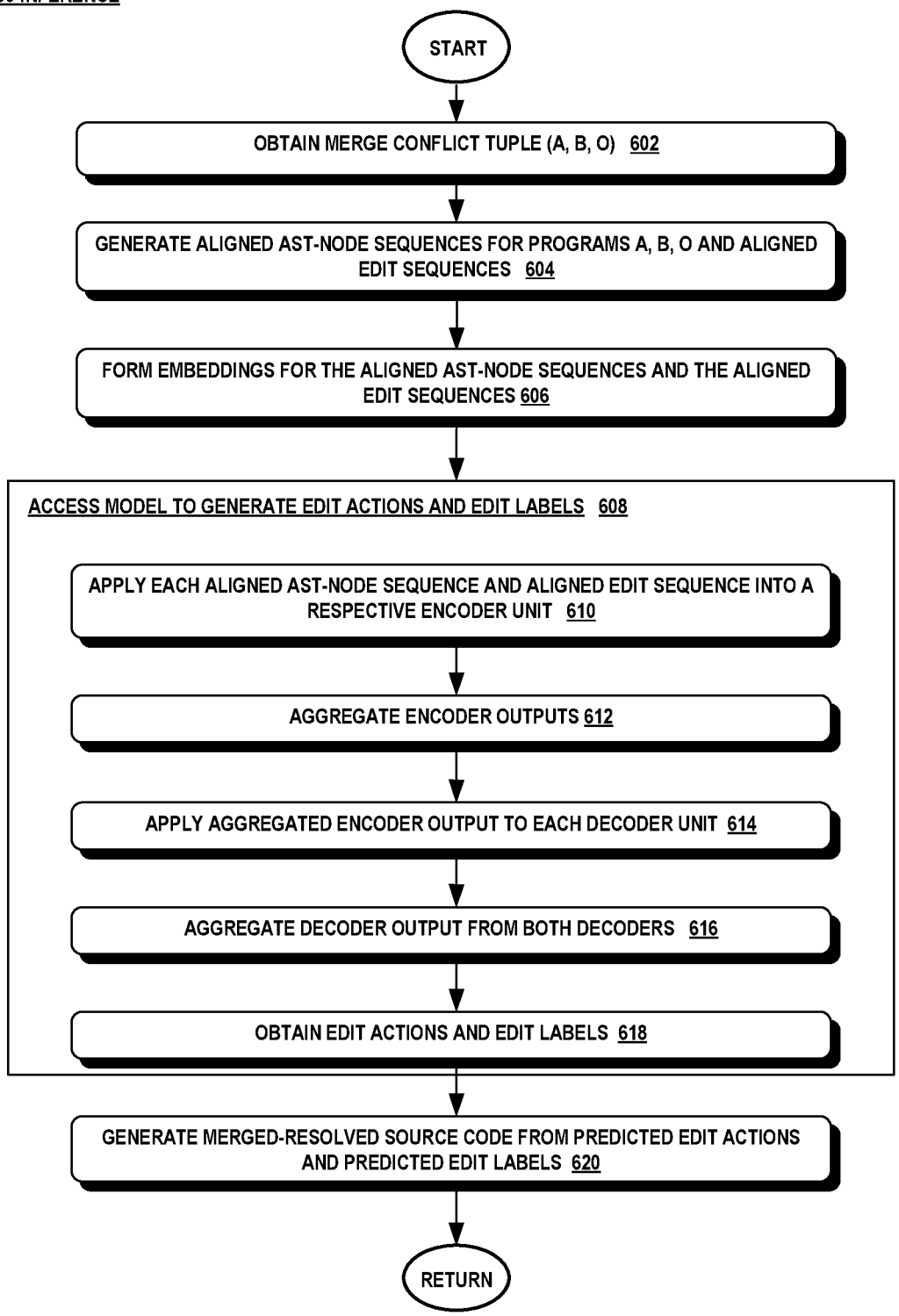
FIG. 6 is a flow diagram illustrating an exemplary method for utilizing the multi-task neural transformer model to predict merge conflict resolutions.

Turning to FIG. 6, there is shown an exemplary method 600 for predicting a merge resolution. A request to resolve a merge conflict is received and the corresponding merge conflict tuple (A, B, O) is obtained. In one aspect, the multi-task neural transformer system may be part of a version-controlled source code repository. The source code repository may detect a merge conflict and invoke the multi-task neural transformer model to generate a resolution. The programs involved in the merge conflict are obtained from their respective source code repositories (Collectively, block 602).

The AST sequence generator 504 generates the AST-node sequences and edit sequences from which the aligned AST-node sequences for programs A, B, and O and the aligned edit sequences are created (block 604). Embeddings for the input sequences are formed for the aligned AST-node sequences and aligned edit sequences (block 606). The embedding sequences are input into the model to predict edit actions and edit labels to be applied to the code base O (block 608).

An embedding is a low-dimensional learned continuous vector representation of a discrete variable. Initial values are generated for the embeddings and the multi-task neural transformer model learns the token embedding and the positional embeddings from the training dataset which are stored in a token embedding matrix and a positional embedding matrix for use in the interference phase.

Each aligned AST-node embedding sequence and aligned edit embedding sequence is applied to a respective encoder unit of the neural transformer model (block 610). The output from each encoder is aggregated (block 612) and applied to each decoder unit (block 614). The output of each decoder unit is aggregated (block 616). The dual decoder units output a respective edit action sequence and an edit label sequence (block 618). The edit action sequence and the edit label sequence are then used by the resolution engine to generate a source code snippet with the changes to the code base based on the predicted edit actions and edit labels (block 620).

Exemplary Operating Embodiments

Figure 7:
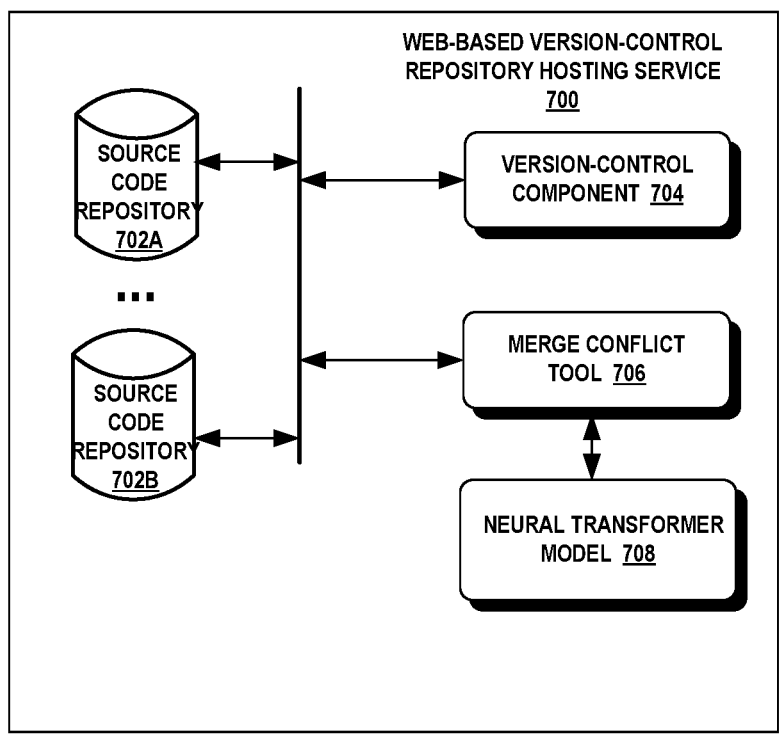
FIG. 7 is a block diagram illustrating a first exemplary operating environment.

In one aspect, the multi-task neural transformer model is deployed as part of a web-based version-control hosting service. Turning to FIG. 7, there is shown an exemplary web-based version-control hosting service 700. The service 700 is a file archive and web hosting service for source code, documentation, and other related data stored in source code repositories 702A, 702B ("702"). The source code repositories may be publicly-accessible or private. The service 700 includes a version-control component 704 that tracks changes made to the files in a source code repository over time.

The service 700 includes a merge conflict tool 706 that automatically generates proposed merge resolutions upon detection of a program merge or a resolution strategy. The merge conflict tool 706 monitors the merge operations performed at a source code repository and automatically generates an edit action sequence and an edit label sequence.

Figure 8:
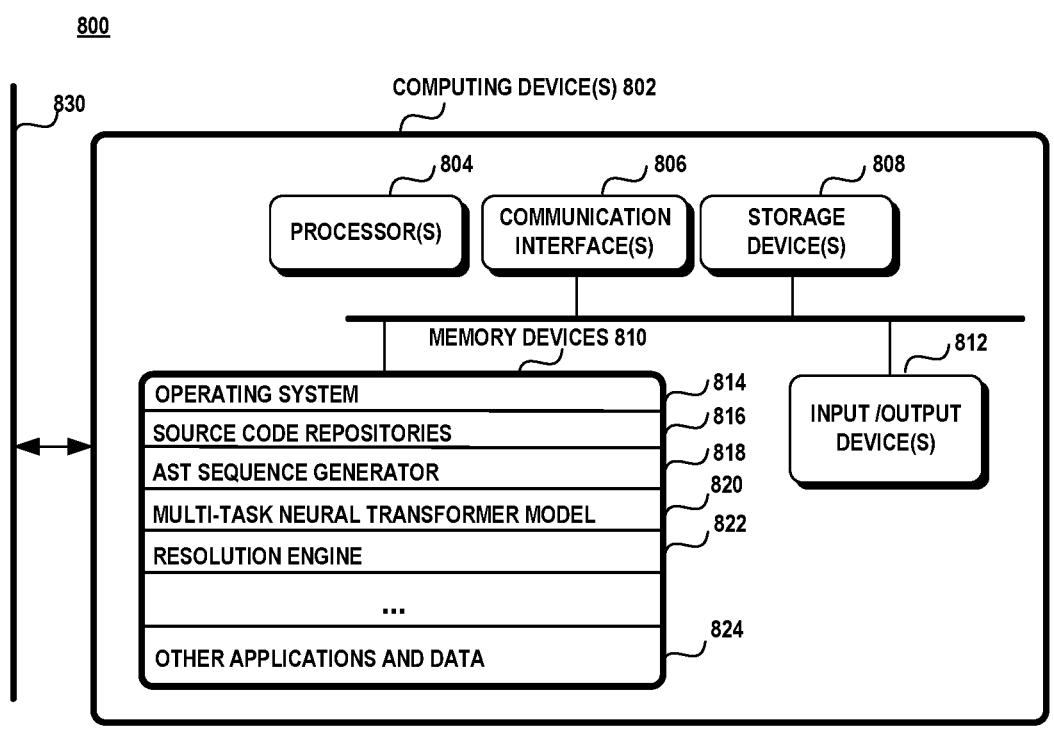
FIG. 8 is a block diagram illustrating a second exemplary operating environment.

FIG. 8 illustrates another exemplary operating environment 800 in which one or more computing devices 802 are used to train and/or utilize the multi-task neural transformer model to generate merge conflict resolutions. In an aspect, computing devices 802 may be configured as a cloud service that performs the merge resolution as a service. It should be noted that the operating environment is not limited to any particular configuration and other configurations are possible.

A computing device 802 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

The computing device 802 may include one or more processors 804, one or more communication interfaces 806, one or more storage devices 808, one or more memory devices or memories 810, and one or more input/output devices 812. A processor 804 may be any commercially available or customized processor and may include dual microprocessors and multi-processor architectures. A communication interface 806 facilitates wired or wireless communications between the computing device 802 and other devices. A storage device 808 may be computer-readable medium that does not contain propagating signals, such as modulated data signals transmitted through a carrier wave. Examples of a storage device 808 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 808 in the computing device 802. The input/output devices 812 may include a keyboard, mouse, pen, voice input device, touch input device, display, speakers, printers, etc., and any combination thereof.

A memory device or memory 810 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 810 may also include one or more external storage devices or remotely located storage devices that do not pertain to propagated signals, such as modulated data signals transmitted through a carrier wave.

The memory device 810 may contain instructions, components, and data. A component is a software program that performs a specific function and is otherwise known as a module, program, component, and/or application. The memory device 810 may include an operating system 814, source code repositories 816, an AST sequence generator 818, a multi-task neural transformer model 820, a resolution engine 822, and other applications and data 824.

The computing devices 802 may be communicatively coupled via a network 830. The network 830 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 830 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/ Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of automatically resolving a merge conflict between changes made to a code base O from program A and program B. The technical features associated with addressing this problem is the configuration of a multi-task neural transformer model that predicts the edit actions to an AST-node representation of the code base to resolve the merge conflict and the edit labels that are applied with the predicted edit actions. The technical effect achieved is the automatic generation of a merge resolution without user intervention.

Conclusion

A system is disclosed comprising one or more processors and a memory that stores one or more programs that are configured to be executed by the one or more processors. The one or more programs including instructions to perform acts that: obtain a merge conflict tuple having components A, B, and O, where component A and component B are source code snippets having modifications made to code base O; generate an abstract syntax tree (AST) for each component A, B, and O of the merge conflict tuple; construct aligned AST-node sequences and AST editing sequences for the merge conflict tuple from the ASTs of the components A, B, and O; access a deep learning model to predict a sequence of tree editing steps to resolve the merge conflict tuple given the aligned AST-node sequences and the AST editing sequences of the merge conflict tuple; and apply the predicted sequence of tree editing steps to the code base O.

In an aspect, the tree editing steps include a sequence of edit actions and a sequence of edit labels, wherein the sequence of edit actions are applied to the AST of the code base O with the sequence of edit labels. In an aspect, the one or more programs include instructions to perform acts that: traverse the AST of component A of the merge conflict tuple to generate an AST-node sequence for the component A; traverse the AST of component B of the merge conflict tuple to generate an AST-node sequence for the component B; and traverse the AST of component BASE of the merge conflict tuple to generate an AST-node sequence for the component BASE.

In an aspect, the one or more programs include instructions to perform acts that: align nodes of the AST of component A with similar nodes of the AST of component BASE to generate aligned AST-node sequence A|BASE; align nodes of the AST of component BASE with similar nodes of the AST of component A to generate aligned AST-node sequence BASE|A; and generate edit sequence for component A from the aligned AST-node sequence A|BASE and the aligned AST-node sequence BASE|A.

In an aspect, the one or more programs include instructions to perform acts that: align nodes of the AST of component B with similar nodes of the AST of component BASE to generate aligned AST-node sequence B|BASE; align nodes of the AST of component BASE with similar nodes of the AST of component B to generate aligned AST-node sequence BASE|B; and generate edit sequence for component B from the aligned AST-node sequence B|BASE and the aligned AST-node sequence BASE|B.

In an aspect, the deep learning model is configured as a neural transformer model with attention. In an aspect, the neural transformer model with attention includes a separate encoder for each of the aligned AST-node sequences and for each edit sequence. In an aspect, the neural transformer model with attention includes a dual decoder unit, wherein a first decoder unit predicts edit actions given an aggregated encoding of the aligned AST-node sequences and each edit sequence, wherein the second decoder unit predicts edit labels for the edit actions.

A computer-implemented method is disclosed, comprising: detecting a merge conflict between source code snippet A, source code snippet B, and code base O; transforming source code snippet A, source code snippet B, and code base O into a respective abstract syntax tree (AST), wherein source code snippet A and source code snippet B include conflicting modification to code base O; constructing a plurality of aligned AST-node sequences and a plurality of aligned edit sequences, wherein the plurality of aligned AST-node sequences and the plurality of edit sequences are derived from the respective ASTs of source code snippet A, source code snippet B, and code base O; predicting tree editing steps to resolve the merge conflict from a deep learning model, wherein the deep learning model predicts a merge conflict resolution given the plurality of aligned AST-node sequences and the plurality of aligned edit sequences; and applying the predicted tree editing steps to the code base O.

In an aspect, the computer-implemented method further comprises: generating an AST-node sequence for source code snippet A from the AST of source code snippet A; generating an AST-node sequence for source code snippet B from the AST of source code snippet B; and generating an AST-node sequence for code base O from the AST of code base O. In an aspect, the computer-implemented method further comprises: aligning the AST-node sequences for source code snippet A, source code snippet B, and code base O to generate the plurality of aligned AST-node sequences and the plurality of aligned edit sequences.

In an aspect, the tree editing steps includes a sequence of edit actions to be applied to code base O and a sequence of edit labels that are applied to code base O with the sequence of edit actions. In an aspect, the plurality of aligned edit sequences includes a first edit sequence and a second edit sequence, the first edit sequence represents differences between the aligned AST-node sequence for source code snippet A and the aligned AST-node sequence for code base O, and the second edit sequence represents differences between the aligned AST-node sequence for source code snippet B and the aligned AST-node sequence for code base O.

In an aspect, the deep learning model includes a plurality of encoder units, wherein each of the plurality of encoder units generates an encoding for a specific one of the plurality of aligned AST-node sequences and the plurality of edit sequences. In an aspect, the deep learning model includes a first decoder unit and a second decoder unit, wherein the first decoder unit predicts the sequence of edit actions and a second decoder unit predicts the sequence of edit labels.

A device is disclosed comprising: a processor coupled to a memory device. The processor is configured to perform acts to: detect a merge conflict between source code component A, source code component B, and code base O, wherein source code component A includes a modification to code base O, wherein source code component B includes a modification to code base O; represent the merge conflict as a plurality of aligned abstract syntax tree (AST)-node sequences and a plurality of edit sequences; predict a merge resolution for the merge conflict from a deep learning model, wherein the deep learning model is given the plurality of aligned AST-node sequences and the plurality of edit sequences, wherein the predicted merge resolution includes tree editing steps; and apply the tree editing steps to the code base O to resolve the merge conflict.

In an aspect, the plurality of aligned AST-node sequences includes aligned AST-node sequence A|BASE, aligned AST-node sequence BASE|A, aligned AST-node sequence B|BASE, and aligned AST-node sequence BASE|B. In an aspect, the deep learning model includes an encoder unit for each of the plurality of aligned AST-node sequences and for each of the plurality of edit sequences. In an aspect, the tree editing steps include a sequence of edit actions and a sequence of edit labels to be applied to the code base O. In an aspect, the deep learning model includes a first decoder unit to predict the sequence of edit actions to apply to code base O and a second decoder unit to predict the sequence of edit labels to apply to code base O.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system comprising:
   one or more processors; and
   a memory that stores one or more programs that are configured to be executed by the one or more processors, the one or more programs including instructions to perform acts that:
   obtain a merge conflict tuple having components A, B, and O, where component A and component B are source code snippets having modifications made to code base O;
   generate an abstract syntax tree (AST) for each component A, B, and O of the merge conflict tuple;
   construct aligned AST-node sequences and AST editing sequences for the merge conflict tuple from the ASTs of the components A, B, and 0;
   access a deep learning model to predict a sequence of tree editing steps to resolve the merge conflict tuple given the aligned AST-node sequences and the AST editing sequences of the merge conflict tuple; and
   apply the predicted sequence of tree editing steps to the code base O.

2. The system of claim 1, wherein the tree editing steps include a sequence of edit actions and a sequence of edit labels, wherein the sequence of edit actions are applied to the AST of the code base O with the sequence of edit labels.

3. The system of claim 1, wherein the one or more programs include instructions to perform acts that:
   traverse the AST of component A of the merge conflict tuple to generate an AST-node sequence for the component A;
   traverse the AST of component B of the merge conflict tuple to generate an AST-node sequence for the component B; and
   traverse the AST of component BASE of the merge conflict tuple to generate an AST-node sequence for the component BASE.

4. The system of claim 3, wherein the one or more programs include instructions to perform acts that:
   align nodes of the AST of component A with similar nodes of the AST of component BASE to generate aligned AST-node sequence A|BASE;
   align nodes of the AST of component BASE with similar nodes of the AST of component A to generate aligned AST-node sequence BASE|A; and
   generate edit sequence for component A from the aligned AST-node sequence A|BASE and the aligned AST-node sequence BASE|A.

5. The system of claim 4, wherein the one or more programs include instructions to perform acts that:
   align nodes of the AST of component B with similar nodes of the AST of component BASE to generate aligned AST-node sequence B|BASE;
   align nodes of the AST of component BASE with similar nodes of the AST of component B to generate aligned AST-node sequence BASE|B; and
   generate edit sequence for component B from the aligned AST-node sequence B|BASE and the aligned AST-node sequence BASE|B.

6. The system of claim 5, wherein the deep learning model is configured as a neural transformer model with attention.

7. The system of claim 6, wherein the neural transformer model with attention includes a separate encoder for each of the aligned AST-node sequences and for each edit sequence.

8. The system of claim 7, wherein the neural transformer model with attention includes a dual decoder unit, wherein a first decoder unit predicts edit actions given an aggregated encoding of the aligned AST-node sequences and each edit sequence, wherein the second decoder unit predicts edit labels for the edit actions.

9. A computer-implemented method, comprising:
   detecting a merge conflict between source code snippet A, source code snippet B, and code base O;
   transforming source code snippet A, source code snippet B, and code base O into a respective abstract syntax tree (AST), wherein source code snippet A and source code snippet B include conflicting modifications to code base O;
   constructing a plurality of aligned AST-node sequences and a plurality of aligned edit sequences, wherein the plurality of aligned AST-node sequences and the plurality of aligned edit sequences are derived from the respective ASTs of source code snippet A, source code snippet B, and code base O;
   predicting tree editing steps to resolve the merge conflict from a deep learning model, wherein the deep learning model predicts a merge conflict resolution given the plurality of aligned AST-node sequences and the plurality of aligned edit sequences; and
   applying the predicted tree editing steps to the code base O.

10. The computer-implemented method of claim 9, further comprising:
    generating an AST-node sequence for source code snippet A from the AST of source code snippet A;
    generating an AST-node sequence for source code snippet B from the AST of source code snippet B; and
    generating an AST-node sequence for code base O from the AST of code base O.

11. The computer-implemented method of claim 10, further comprising:
    aligning the AST-node sequences for source code snippet A, source code snippet B, and code base O to generate the plurality of aligned AST-node sequences and the plurality of aligned edit sequences.

12. The computer-implemented method of claim 9, wherein the tree editing steps includes a sequence of edit actions to be applied to code base O and a sequence of edit labels that are applied to code base O with the sequence of edit actions.

13. The computer-implemented method of claim 9, wherein the plurality of aligned edit sequences includes a first edit sequence and a second edit sequence, wherein the first edit sequence represents differences between the aligned AST-node sequence for source code snippet A and the aligned AST-node sequence for code base O, wherein the second edit sequence represents differences between the aligned AST-node sequence for source code snippet B and the aligned AST-node sequence for code base O.

14. The computer-implemented method of claim 9, wherein the deep learning model includes a plurality of encoder units, wherein each of the plurality of encoder units generates an encoding for a specific one of the plurality of aligned AST-node sequences and the plurality of edit sequences.

15. The computer-implemented method of claim 14, wherein the deep learning model includes a first decoder unit and a second decoder unit, wherein the first decoder unit predicts the sequence of edit actions and a second decoder unit predicts the sequence of edit labels.

16. A device, comprising:

a processor coupled to a memory device;

wherein the processor is configured to perform acts to:

detect a merge conflict between source code component A, source code component B, and code base O, wherein source code component A includes a modification to code base O, wherein source code component B includes a modification to code base O;

represent the merge conflict as a plurality of aligned abstract syntax tree (AST)-node sequences and a plurality of edit sequences;

predict a merge resolution for the merge conflict from a deep learning model, wherein the deep learning model is given the plurality of aligned AST-node sequences and the plurality of edit sequences, wherein the predicted merge resolution includes tree editing steps; and apply the tree editing steps to the code base O to resolve the merge conflict.

17. The device of claim 16, wherein the plurality of aligned AST-node sequences includes aligned AST-node sequence A|BASE, aligned AST-node sequence BASE|A, aligned AST-node sequence B|BASE, and aligned AST-node sequence BASE|B.

18. The device of claim 17, wherein the deep learning model includes an encoder unit for each of the plurality of aligned AST-node sequences and for each of the plurality of edit sequences.

19. The device of claim 16, wherein the tree editing steps include a sequence of edit actions and a sequence of edit labels to be applied to the code base O.

20. The device of claim 19, wherein the deep learning model includes a first decoder unit to predict the sequence of edit actions to apply to code base O and a second decoder unit to predict the sequence of edit labels to apply to code base O.

* * * * *

UNITED STATES PATENT AND TRADEMARK OFFICE
CERTIFICATE OF CORRECTION

| | | |
|---|---|---|
| PATENT NO. | : 11,714,617 B1 | Page 1 of 1 |
| APPLICATION NO. | : 17/584382 | |
| DATED | : August 1, 2023 | |
| INVENTOR(S) | : Neelakantan Sundaresan, Alexey Svyatkovskiy and Negar Ghorbani | |

It is certified that error appears in the above-identified patent and that said Letters Patent is hereby corrected as shown below:

On the Title Page

Column 1 Item (65) Please insert the following:
-- (65) Prior Publication Data
US 2023/0236811A1 July 27, 2023 --

Signed and Sealed this
Eleventh Day of February, 2025

Coke Morgan Stewart
*Acting Director of the United States Patent and Trademark Office*